United States Patent Office 2,748,975
Patented June 5, 1956

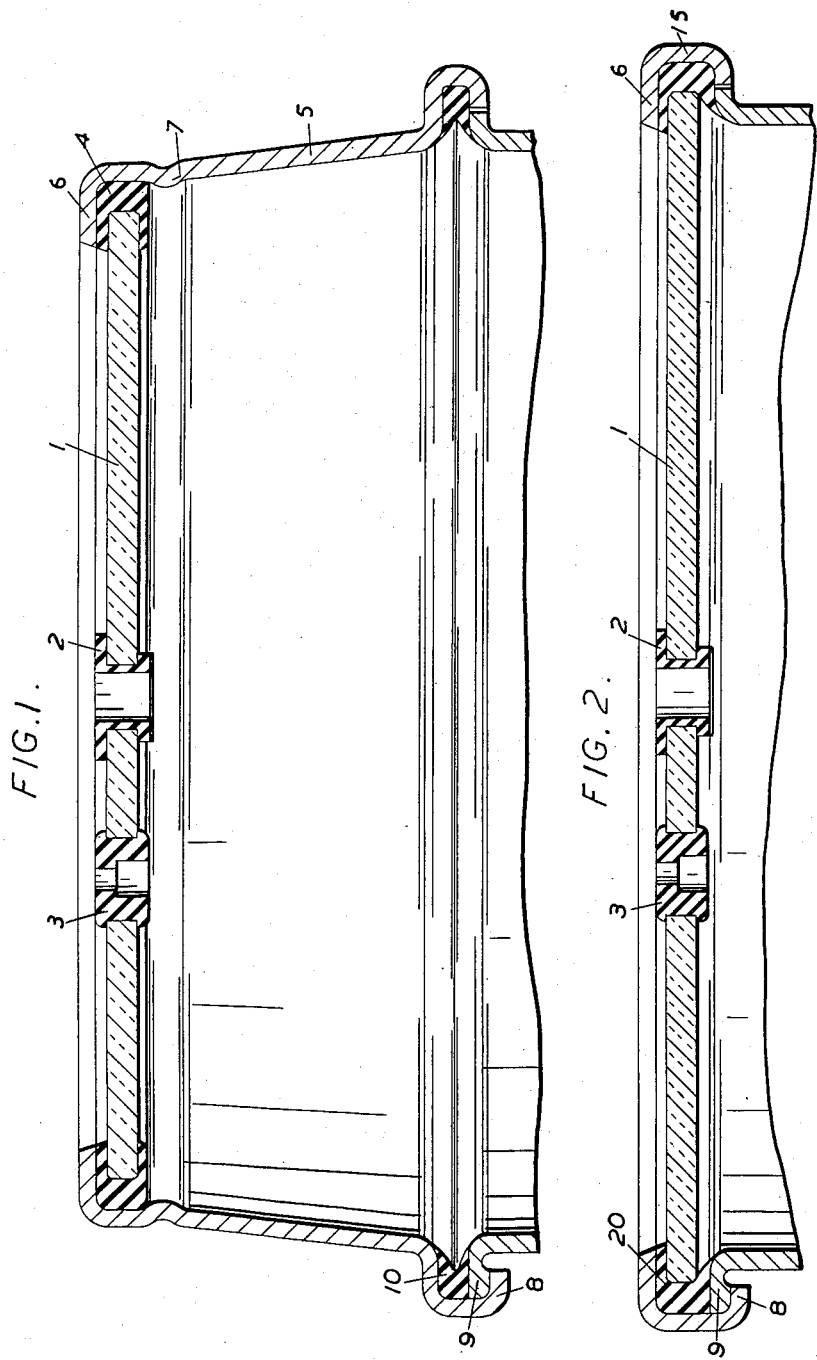

2,748,975
PRESSURE COOKERS

Felix Carl Jacobson, Duffield, England, assignor to Platers & Stampers Limited, London, England Application July 17, 1952, Serial No. 299,490

2 Claims. (Cl. 220—46)

This invention relates to pressure cookers of the type comprising a vessel fitted with a lid which is adapted to be sealed in position at an opening in the vessel to permit cooking of foodstuffs within the vessel under steam pressure. In particular it relates to vessels of the above type in which a glass window is provided in the cover to permit inspection of the contents of the vessel during the cooking of food in the vessel.

In my patent application Serial No. 204,797 is described a pressure cooker of the type having a lid adapted to engage under an inturned flange surrounding a non-circular aperture in the top of the vessel. In this construction the lid is made wholly of glass and consists substantially of a flat glass disc with a suitable aperture formed therein for a pressure relief valve.

The construction shown in patent application Serial No. 204,797 suffers from certain disadvantages when it is applied to the type of pressure cooker in which the vessel is closed by means of a lid having lug formations on a downwardly projecting peripheral flange adapted to interengage with lug formations carried on the exterior of the periphery of the vessel.

According to the present invention a pressure cooker comprising a vessel provided at its top with a removable lid made with a transparent window in the form of a disc of heat-resistant transparent material dimensioned so as to have the necessary strength for withstanding the steam pressure generated in the vessel under working conditions and so as to afford a window of sufficient area to permit easy inspection of substantially the whole of the bottom of the vessel, a peripheral vessel-engaging, metal member surrounding said disc, a resilient gasket for sealing between the disc and formations on the vessel-engaging cover member to retain the resilient gasket, said resilient gasket having a groove to hold the edge of the disc and the peripheral member. In thic construction the glass portion will preferably be of flat disc shape to ensure maximum visibility of the contents.

By this construction it is possible to avoid the manufacture of a relatively complex-shaped glass lid in a heat-resistant glass material, particularly such as would be required for the type of pressure cooker having a lid which engages with peripheral lugs on the exterior of the vessel.

In order that the invention may be more clearly understood reference is made to the accompanying drawings wherein:

Figure 1 is a section of one form of pressure cooker constructed in accordance with the present invention.

Figure 2 is a section of a modified form of pressure cooker.

In Figure 1 there is shown a construction of pressure cooker in which the lid is domed to provide a large space upwardly of the pot part of the cooker.

In this cooker the lid comprises a roughly circular glass disc 1 made of a suitable heat-resistant glass, apertured to receive rubber mouldings 2 and 3 which serve to locate respectively a conventional pressure relief valve and a fusible pressure relief plug of known construction (not shown).

The disc 1 has its edges encircled by a gasket 4 made of a suitable heat-resistant rubber material, which engages under a small inwardly directed flange 6 of a metal cover member 5 of generally cylindrical shape. The flange 6 is of such a depth as to afford a secure abutment surface against which the glass disc 1 may be pressed by the steam pressure generated within the vessel without fear of damake under working conditions.

The glass disc 1 and its gasket 4 are retained in position by a shallow shoulder 7 formed in the metal member 5, past which the resilient gasket 4 can be forced to get the disc 1 into the desired position.

The bottom edge of the metal cover member 5 has inwardly directed spaced lug members 8, engaging under corresponding spaced lugs 9 on the body of the pot part of the pressure cooker. The seal between the lid and the pot part is effected by means of a Y-shaped gasket 10 retained within a peripheral groove in the metal cover member 5. (To show this, the left and right hand sides of Figure 1 are in planes at right angles to each other).

Figure 2 shows a modification of the construction of Figure 1 in which a relatively flat lid is used.

In this construction the glass disc 1 is mounted in the modified form of gasket 20 used to form the seal between the pot and the modified form of metal cover member 15 used in this construction.

In all other respects the construction of Fig. 2 is the same as that of Figure 1.

The top part of the gasket 20 which carries the disc 1 seals against the metal cover member 15 under steam pressure, while the downwardly projecting limb of the gasket is pressed against a surface around the inside of the lip of the pot or vessel portion of the lip of the pressure cooker by steam pressure to form a seal in the same manner as the lower limb of the Y-shaped gasket 10.

I claim:

1. A pressure cooker comprising a vessel provided at its top with a removable lid, said lid comprising a flat heat-resistant glass disc dimensioned so as to have the necessary strength for withstanding the steam pressure generated in the vessel under working conditions and so as to afford a window of sufficient area to permit easy inspection of substantially the whole of the bottom of the vessel, a peripheral vessel-engaging metal cover member surrounding said disc, and of generally cylindrical shape to give a lid of substantial depth, a rubber or like gasket arranged between an overhanging inturned flange at the top of the peripheral cover member and a shallow shoulder beneath said flange, said gasket having a groove to hold the edge of the disc, and said peripheral member carrying a gasket in a groove adjacent its bottom edge for sealing against a surface around the top of the vessel.

2. A pressure cooker according to claim 1 wherein said gasket has a downwardly projecting limb for sealing against a surface around the top of the vessel.

References Cited in the file of this patent

UNITED STATES PATENTS

| | | |
|---|---|---|
| 116,272 | Collins et al. | June 27, 1871 |
| 482,258 | Lehucher et al. | Sept. 6, 1892 |
| 1,230,419 | Lowe | June 19, 1917 |
| 1,275,598 | Probst | Aug. 13, 1918 |
| 2,261,035 | Miller | Oct. 28, 1941 |
| 2,311,077 | Oldham | Feb. 16, 1943 |
| 2,399,115 | Hansen et al. | Apr. 23, 1946 |
| 2,472,620 | Rhodes et al. | June 7, 1949 |
| 2,599,212 | Triplett | June 3, 1952 |

FOREIGN PATENTS

| | | |
|---|---|---|
| 124,444 | Great Britain | Sept. 11, 1919 |